United States Patent [19]

Eakins et al.

[11] 4,020,721
[45] May 3, 1977

[54] APPARATUS AND METHOD FOR CUTTING CONTINUOUS STOCK

[75] Inventors: Russell W. Eakins; Robert August Hagan, both of North Vernon, Ind.

[73] Assignee: International Telephone and Telegraph Corporation, New York, N.Y.

[22] Filed: Dec. 10, 1975

[21] Appl. No.: 639,388

[52] U.S. Cl. .................................. 83/37; 83/308; 83/314
[51] Int. Cl.² ........................................ B26D 1/56
[58] Field of Search ............. 83/37, 308, 314, 319, 83/320

[56] References Cited

UNITED STATES PATENTS

| 1,269,635 | 6/1918 | Neuman | 83/308 X |
| 1,800,005 | 4/1931 | Braun | 83/308 X |
| 2,675,076 | 4/1954 | Billetter | 83/308 X |
| 3,129,624 | 4/1964 | Auer | 83/320 X |
| 3,704,643 | 12/1972 | Cookson | 83/319 X |
| 3,800,645 | 4/1974 | Alcock et al. | 83/308X |

*Primary Examiner*—Frank T. Yost
*Attorney, Agent, or Firm*—James B. Raden; William J. Michals

[57] ABSTRACT

In the disclosed apparatus, a movable die is slidably mounted about a guide base for translation along a longitudinal direction thereof. The movable die is spring biased toward one end of the die guide and accepts the continuous strip stock output of a rolled mill as fed by the mill. A straight rod is pivotally mounted to the movable die for translation therewith. The rod is slidably mounted about an adjacent stationary table which projects away from the movable die in the direction of movement of the strip stock. The rod includes a cut-off block fixedly mounted at a predetermined point intermediate the ends of the rod. As the strip stock advances through guide surfaces disposed about the table, it engages the block so that upon subsequent movement of the stock the movable die is translated with the stock. When a given surface of the die reaches a predetermined point, the surface engages a microswitch which closes the cutting blades of the movable die to sever a predetermined length of strip stock. Simultaneously, a cam follower on the rod engages a cooperating stationary cam surface to rotate the rod about its longitudinal axis to facilitate ejection of the severed predetermined length of stock. The table is mounted to a universal adjustable mount and the rod is pivotally mounted to the movable die thereby to readily accomodate curved strip stock.

10 Claims, 4 Drawing Figures

APPARATUS AND METHOD FOR CUTTING CONTINUOUS STOCK

BACKGROUND OF THE INVENTION

The present invention relates to the strip stock metal working art and, more particularly, to apparatus and method for cutting continuous stock into predetermined severed lengths.

In the prior art, an infinite source of strip stock, such as that provided by a roll mill, is used to provide a wide variety of products. For example, the door frames of automotive vehicles are typically constructed from relatively rigid strip stock of a given cross-sectional configuration and having any one of a variety of different shapes and forms. The door frame is comprised of a plurality of individual members which are welded together at corner portions of the door frame. The complete door frame accomodates the window and regulator assembly and, of course, the relatively thin sheet metal body portion.

In these applications, the continuous strip stock is cut in a process utilizing a ram powered cutting die assembly in conjunction with a strip stock feeding system. In conventional bench presses, the ram is mounted within a generally C-shaped housing having an arm which slidably accomodates the ram and a bed portion upon which the cutting die rests. These presses contain a fly wheel contained within the housing which typically continually rotates and is provided with a single revolution clutch so that upon engagement of the fly wheel with the mechanism for reciprocating the ram, the ram is driven downwardly and upwardly through a single cycle. The feeding system is either mechanically linked to, or is synchronized in time relationship therewith, the mechanism for reciprocating the ram. The feeding system functions to advance the strip stock so that when the ram is actuated, the desired member is severed to a somewhat predetermined length when the ram engages the cutting die.

However, these techniques for cutting strip stock members labor with the disadvantages in that the time relationship between actuation of the ram and feeding of the strip stock does not consistently provide the desired predetermined length. That is, since the ram typically fails to return exactly to its top-dead-center (TDC), the ram must accordingly travel a greater or lesser distance during the subsequent cylce. Since distance, in this context, is also directly related to time, the desired synchronization between the strip stock feeding system and the ram movement cannot be attained. In this regard, it will be appreciated by those skilled in the art that even a small angular deviation from top-dead-center can result in a severed member which is substantially greater than or even less than the desired length. Accordingly, substantial material waste results which must be trimmed in an additional operation; and, in some cases the entire member must be scrapped —i.e., if it is too short. This disadvantage is further aggravated by virtue of the high rates of production speed which are necessary to provide competitive productivity. For example, in a typical operation wherein strip stock members are cut to an average length of 30 inches, the desired production rate is typically on the order of 700 per hour.

These and other disadvantages are overcome by the present invention wherein there is provided apparatus and a method for precisely cutting continuous strip stock into predetermined lengths. Further, as will be explained more fully hereinafter, a preferred embodiment of the present invention readily accomodates continuous strip stock which is curved in one or more spacial directions.

SUMMARY OF THE INVENTION

Briefly, the invention provides a method and apparatus for cutting continuous strip stock into severed sections of predetermined lengths and comprises a guide base upon which a cutting die is slidably mounted for translation in a given direction between first and second positions. The die housing includes means for cutting the strip. A strip guide frame is fixedly mounted relative to the guide base and carries a rigid member which is connected to the die housing and extends away from the cutting die in the geneal direction of movement of the strip stock. A stop member is fixedly attached to the rigid member at a predetermined point thereon and the stop member is adapted to engage the fed end of the strip. Means are provided for moving the strip through the die housing and towards the stop member; and, means are provided for actuating the cutting means when the die housing is translated to the second position by the motion of the rigid member in response to the movement of the engaged, fed end of the strip.

BRIEF DESCRIPTION OF THE DRAWING

The advantages of this invention will become more readily appreciated as same becomes better understood by reference to the following detailed description when taken in conjunction with the accompanying drawing wherein.

DETAILED DESCRIPTION

Figure 1:
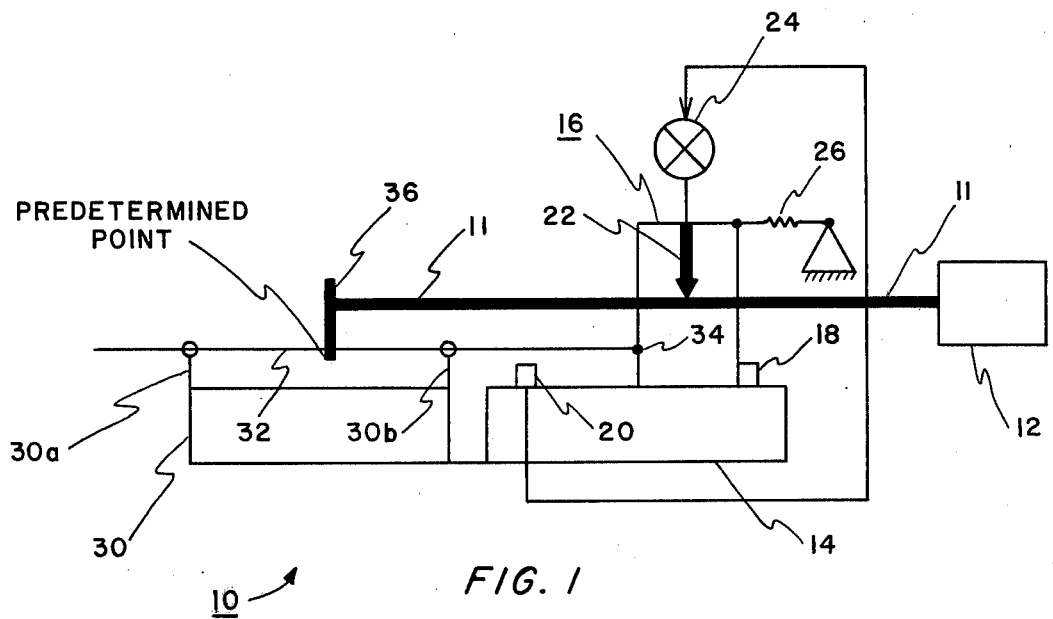
FIGS. 1 and 2 provide simplified diagramatic sideviews useful in explaining the principles of operation of the apparatus for cutting continuous strip stock in accordance with the present invention.
Figure 2:
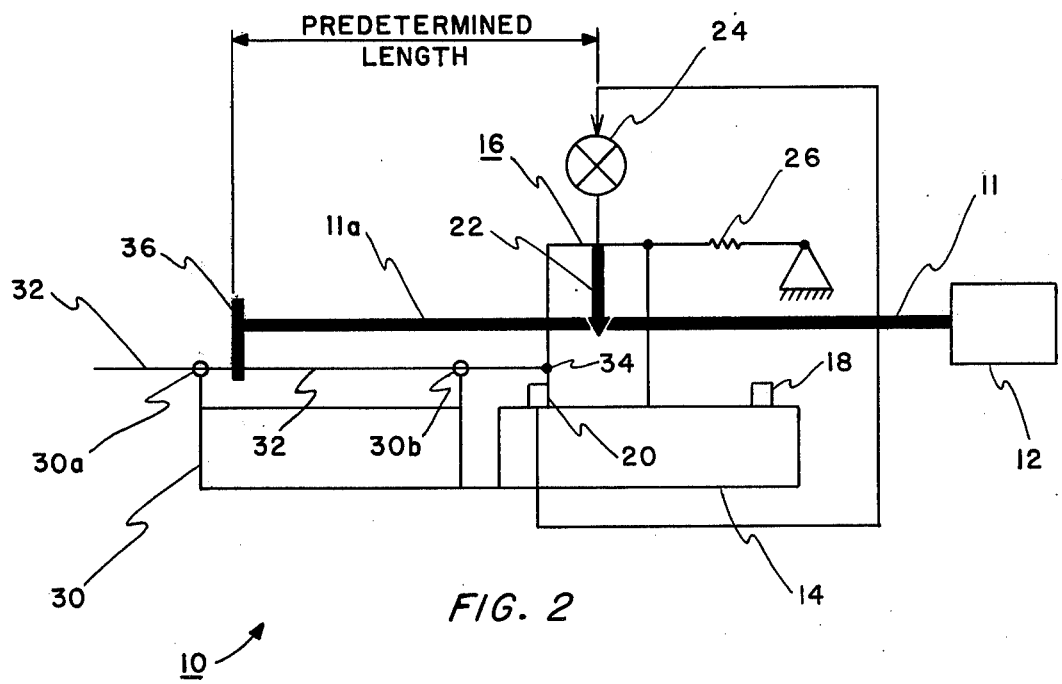

Referring now to FIGS. 1 and 2, there are shown simplified diagramatic side views which are useful in explaining the basic principles of operation of the apparatus and method in accordance with the present invention. The apparatus for cutting continuous strip stock into severed sections of predetermined length is shown generally at 10. An infinite source of continuous strip stock 11 is provided by roll mill 12, the details of which are well known in the art and accordingly need not be explained in detail herein. The cutting apparatus includes a guide base 14 upon which a cutting die housing 16 is slidably mounted for translation between a first position or stop 18 and a second position or stop 20. The die housing 16 includes cutting means, disgramatically represented by arrow 22 in FIGS. 1 and 2, which are responsive to means 24 for actuating cutting means 22 when die housing 16 is translated to the second position 20. Die housing 16 is normally spring biased towards the first stop 18 by way of a suitable spring 26.

Strip 11 from roll mill 12 is fed into and through die housing 16 by means internal to roll mill 12. A strip guide frame assembly 30 is fixedly mounted relative to guide base 14 adjacent thereto. A rigid rod-like member 32 is slidably carried by guide frame assembly 30 as by suitable journal bearings 30a and 30b. Rod 32 is fixedly connected to die housing 16 preferably by way of a pivotal connection as at 34. A stop member 36 is removably fixedly attached to rod 32 as by way of a setscrew. Finally, second stop 20 is preferably provided with a sensing device such as a microswitch 20a which cooperates with actuating means 24 to actuate cutting means 22 when die housing 16 engages or is translated against second stop 20.

Figure 3:
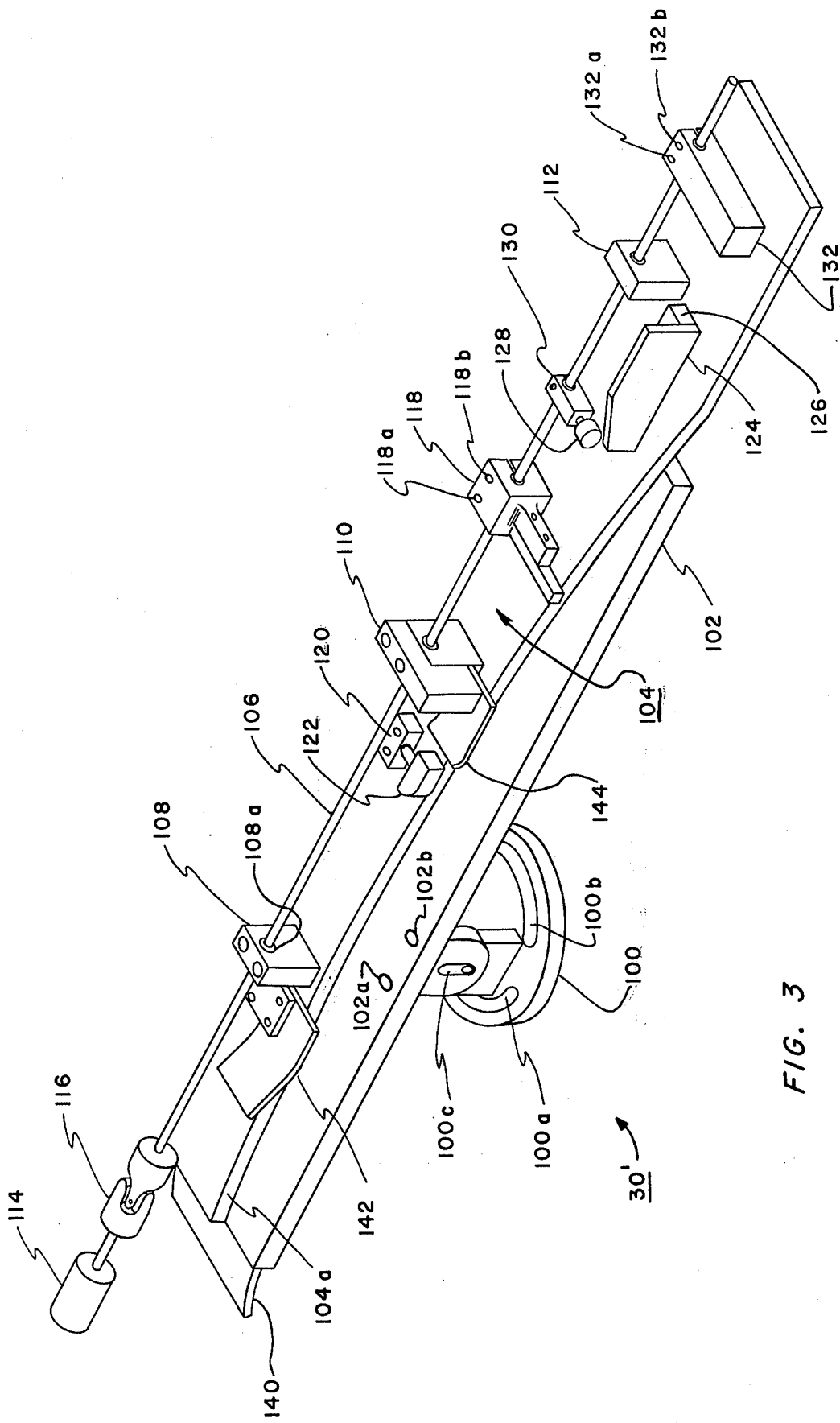
FIG. 3 provides a perspective view of a preferred embodiment of the strip guide and associated apparatus in accordance with the present invention; and, FIG. 4 provides a perspective view of the apparatus of the present invention in accordance with one constructed embodiment including the associated cutting die assembly and a source of strip stock.
Figure 4:
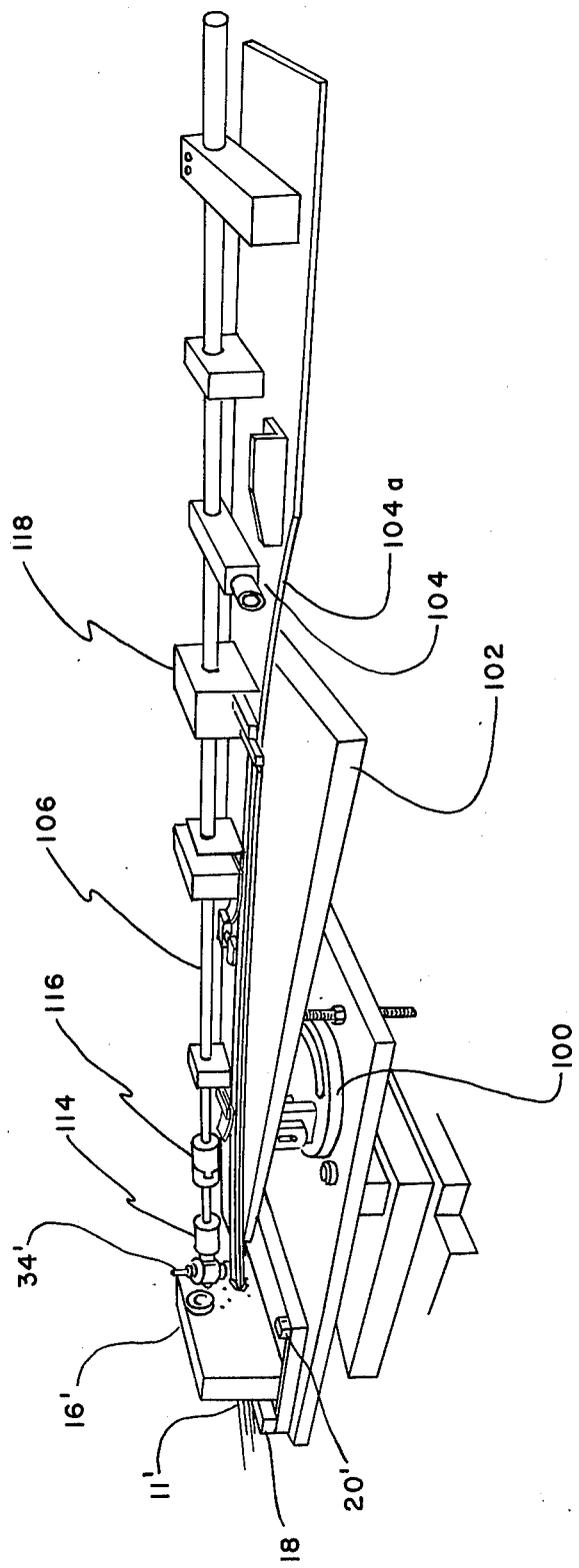

In operation, apparatus 10 of FIGS. 1 and 2 function as follows. Cutting means 22 is initially open and permits strip 11 to be fed by roll mill 12 through die housing 16 and towards stop member 36. The fed end of strip 11 engages stop member 36 whereupon stop member 36, rod 32 and, therefore, die housing 16 are translated away from the first stop toward the second stop. When the continued feeding or movement of strip 11 causes die housing 16 to engage second stop 20, as illustrated in FIG. 2, actuating means 24 is energized causing cutting means 22 to precisely sever a predetermined section 11a of strip 11. Once severed, spring-loaded means (not shown) eject the severed section 11a from apparatus 10 and spring bias means 26 functions to translate die housing 16 back toward first stop 18 after which the cycle is repeated. It can be seen by reference to FIGS. 1 and 2 that the continuous strip stock is consistently severed into predetermined sections as determined by the distance between cutting means 22 and the predetermined mounting point of stop member 36 on rod 32. As will be discussed more fully hereinafter, with reference to the description of certain constructed embodiments as depicted in FIGS. 3 and 4, apparatus 10 readily accomodates continuous strip stock of the curved variety. Moreover, the apparatus in accordance with the present invention can accomodate strip stock having curvature in two directions. This is accomplished by providing means for positioning strip guide frame 30 to any one of an essentially infinite number of points situated along an imaginary semi-hemispheric set of coordinates at the left-hand portions of FIGS. 1 and 2.

Referring now to FIG. 3, there is shown a perspective view of a preferred embodiment of a strip guide frame assembly 30' shown in conjunction with its cooperating apparatus. Guide frame assembly 30' includes a universal, adjustable angle plate or table 100 which includes a plurality of slots shown as 100a, 100b and 100c, which, in turn, cooperate with fasteners to align guide frame assembly 30' into any one of a plurality of angular directions with respect to azimuth and altitude. Guide frame assembly 30' includes a guide base member 102 which is suitably fastened to table 100 as by way of recessed fasteners 102a and 102b. A removable guide plate 104 is similarly fastened to guide base member 102 by way of fastening means. A rigid rod 106 is slidably carried by frame guide 30' by way of fixed journaled blocks 108, 110 and 112 having journal bearings, such as 108a, respectively provided therein. The journaled bearings facilitate the longitudinal slidably mounting of rod 106 and also permit rotation of rod 106 about its longitudinal axis. Rod 106 terminates in a coupling device 114 which is adapted to be fixedly connected to a cooperating cutting die housing (not shown in FIG. 3). Intermediate coupling member 114 and rod 106 is a universal joint 116 which permits guide base member 102 and, therefore, rod 106 to be aligned in any one of a plurality of angular configurations while maintaining the force transmitting connections and relationship between coupling member 114 and rod 106.

A stop member 118 is removably, fixedly attached to rod 106 as by way of setscrews 118a and 118b. A block 120 is attached to guide member 104 by way of suitable fastening means and carries a spring-loaded ejection bar 122 which is normally spring biased and urged away from block 120. A roll-away cam surface 124 is mounted to guide plate 104 as by way of a mounting block 126 and suitable fastening means. Cam surface 124 cooperates with a cam follower 128 which is fixedly attached to rod 106 by way of a suitable mounting block 130. Cam follower 128 functions with cam surface 124 to rotate rod 106 about its longitudinal axis and away from base member 102 when rod 106 is translated into a corresponding position. Finally, a counter weight 132 is fixedly attached to rod 106 by way of suitable fastening means 132a and 132b, and functions to rotate rod 106 back to its initial position by gravity.

The operation of guide frame assembly 30' of FIG. 3 is described as follows. Initially, coupling member 114, and therefore rod 116, are translated away from assembly 30', or leftwardly in FIG. 3, by operation of the spring bias means which urges the associated die housing away from assembly 30'. As the strip stock 11 advances through the die housing, it is guided onto guide base member 102 by way of guide member 140. Guide member 140 merely ensures that the fed strip stock 11 smoothly slides onto the upper portion of guide base member 102. As the strip stock is further advanced, it is guided along a path on guide base member 102 by a vertical surface 104a of guide plate 104. Guide members 142 and 144 also act to constrain the fed strip stock along its intended path of movement. As the strip stock continues to advance, it engages ejection bar 122 and, due to the relative stiffness of the rigid stock, the spring-loaded ejection bar 122 is translated into abutting relationship with its fastening block 120. Thus, the spring force provided by spring-loaded ejection bar 122 provides a potential ejecting force perpendicular to the direction of translation of rod 106 and essentially perpendicular to the direction of travel of the strip stock. Again, however, this force is insufficient to deflect the strip stock prior to the severance thereof due to the relative rigidity or stiffness of the strip stock.

As strip stock 11 continues to advance, the fed end thereof engages stop member 118 whereupon rod 106 is translated along and in correspondence with the movement of the fed strip stock 11. Strip stock 11 and rod 106 continue to advance together until the associated cutting die housing (not shown in FIG. 3) engages a microswitch or other suitable actuation means to close the cutting die within the die housing, thereby to sever the end portion of strip stock 11 into a precise predetermined length. Just prior to the engagement of the die housing with the cutting die actuation means, cam follower 128 engages cam surface member 124 whereupon rod 106 begins to rotate about its longitudinal axis. Rod 106, and therefore, stop member 118 rotate about the longitudinal axis or rod 106 and away from the fed end of the strip stock 11 essentially simultaneously with the cutting operation. As a result of the severing operation, the severed section loses the support otherwise provided by the continuous strip and ejection bar 122 functions to kick-out or roll-away the severed section. Thereafter, the spring biased means on the associated die housing translates the die housing, and therefore rod 106, back toward the initial positions of the die housing and rod 106. During this withdrawal sequence, cam follower 128 is translated away from cam surface member 124 and the weight of counterweight 132 rotates rod 106 back toward its initial position by action of gravity. Thereafter, the cycle is repeated to sever the next section into its predetermined length.

It should be appreciated that surface 104a of guide plate 104 as illustrated in FIG. 3 is provided in a curved configuration. This curved configuration and the cooperating structure, in accordance with the present invention, accomodate curved strip stock. Further, the universal mount 100 of guide frame assembly 30' in FIG. 3 also accomodates curvature of the continuous strip stock in the verticle plane with reference to FIG. 3. That is, by virtue of the curved configuration of guide member 104, the universal mount 100 and the pivotal connection provided by universal joint 116, the apparatus in accordance with the present invention can be positioned to accomodate curved strip stock. It should be noted that while the guide path thusly provided is curved in accordance with the workpiece, the movement of the associated die housing and rigid rod 106 is essentially linear. Accordingly, the construction of the apparatus in accordance with the present invention is not only greatly simplified, but the apparatus can also be readily adjusted to accomodate other irregularly curved workpieces. Stated somewhat differently, a new setup can accomodate a radically different curvature of the continuous strip stock workpiece by adjusting the angular position of universal mount 100 both in azimuth and altitude. Further, the guide plate 104 can be readily replaced with a new member or members, which is machined or otherwise provided with a surface in conformity to the curvature of the workpiece.

Referring now to FIG. 4, there is shown a perspective view of the apparatus in accordance with the present invention, as has been used in one constructed embodiment of the present invention. Cutting die housing 16' was provided in a general block shape having an opening therethrough to accomodate the passage of the fed strip stock. It can be seen that the opening 0 of die housing 16' was provided with a cross-sectional configuration closely approximating that of the continuous strip stock and further provides a feed guide for the strip stock. Slidably disposed internally of die housing 16' was a cutting blade which was closed by a mechanical means responsive to a mircoswitch at the second stop 20'. It can be seen that universal mount 100 was adjusted so that guide base member 102 projected at an angle with respect to both the vertical and horizontal planes. Further, guide plate 104 was provided with a curved surface 104a to accomodate the double curved configuration of strip stock 11'.

What has been taught, then, is an apparatus and method for cutting continuous strip stock into severed sections of predetermined lengths facilitating, notably, the manufacture of door frame members for automotive door frames. The forms of the invention illustrated and described herein are but preferred embodiments of these teachings. They are shown as illustrations of the inventive concepts, however, rather than by way of limitation, and it is pointed out that various modifications, and alterations may be indulged in within the scope of the appended claims.

We claim:

1. Apparatus for cutting continuous strip stock into severed sections of predetermined lengths and wherein said continuous stock is curved, said apparatus comprising, in combination:
    a guide base;
    a cutting die housing slidably mounted to said guide base for translation in a given direction between first and second positions and said die housing including means for cutting said strip;
    a strip guide frame fixedly mounted relative to said guide base and wherein said strip guide frame includes guide means disposed along a curved path accomodating said curved stock;
    a rigid member slidably carried by said guide frame and connected to said die housing and extending away from said die in the general direction of movement of said strip stock;
    a stop member fixedly attached to said rigid member at a predetermined point thereon, said stop member being adapted to engage the fed end of said strip;
    means for moving said strip through said die housing and toward said stop member; and,
    means for actuating said cutting means when said die housing is translated to said second position by the motion of said rigid member in response to the movement of the engaged fed end of said strip.

2. The apparatus according to claim 1, wherein said continuous stock is curved in two spatial coordinates and wherein said guide means includes structure curved in conformity with said continuous stock.

3. The apparatus according to claim 2, wherein said rigid member is pivotally connected to said die housing.

4. The apparatus according to claim 3, wherein said member is pivotally connected to said die housing with a universal joint.

5. The apparatus according to claim 1, including a universal joint connected between said rigid member and said die housing.

6. The apparatus according to claim 1, wherein said means for actuating said cutting means includes a microswitch mounted to said guide base for engaging said die housing when said die housing is translated to said second position.

7. The apparatus according to claim 1, wherein said die housing comprises a block having an opening extending therethrough for receiving said continuous strip and said block including at least one cutting blade slidably mounted within said block for movement in a direction generally transverse to the direction of movement of said strip.

8. The apparatus according to claim 1, wherein said means for actuating said cutting means includes position responsive means responsive to said die housing.

9. The apparatus according to claim 1, wherein said die housing includes spring bias means for urging said die housing toward said first position.

10. A method for cutting continuous strip stock into severed sections of predetermined lengths wherein said strip stock is curved and comprising the steps of:
    providing a cutting die housing slidably mounted to a guide base for translation in a given direction between first and second positions and said die housing including means for cutting said strip;

fixedly mounting a strip guide frame relative to said guide base;

providing a rigid member slidably carried by said guide frame and connected to said die housing and extending away from said die in the general direction of movement of said strip stock;

attaching a stop member fixedly to said rigid member at a predetermined point thereon, said stop member being adapted to engage the fed end of said strip;

moving said strip through said die housing and toward said stop member;

guiding said strip along a curved surface of said guide frame; and, actuating said cutting means when said die housing is translated to said second position by the motion of said rigid member in response to the movement of the engaged fed end of said strip.

* * * * *